United States Patent
Huang et al.

(10) Patent No.: US 9,529,743 B2
(45) Date of Patent: Dec. 27, 2016

(54) FLEXIBLE PCIE ROUTING

(71) Applicant: Quanta Computer Inc., Taoyuan (TW)

(72) Inventors: Jen-Hsuen Huang, Taoyuan (TW); Fa-Da Lin, Taoyuan (TW); Pin-Hao Hung, Taoyuan (TW)

(73) Assignee: Quanta Computer Inc. (TW)

( * ) Notice: Subject to any disclaimer, the term of this patent is extended or adjusted under 35 U.S.C. 154(b) by 0 days.

(21) Appl. No.: 14/690,770

(22) Filed: Apr. 20, 2015

(65) Prior Publication Data

US 2016/0070661 A1 Mar. 10, 2016

Related U.S. Application Data

(60) Provisional application No. 62/047,512, filed on Sep. 8, 2014.

(51) Int. Cl.
*G06F 3/00* (2006.01)
*G06F 13/12* (2006.01)
*G06F 13/00* (2006.01)
*G06F 13/42* (2006.01)

(52) U.S. Cl.
CPC .......... *G06F 13/12* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 7,363,417 B1* | 4/2008 | Ngai | G06F 13/4022 710/305 |
| 7,631,134 B2* | 12/2009 | Jian | G06F 1/185 361/725 |
| 2005/0270298 A1* | 12/2005 | Thieret | G06F 13/409 345/502 |
| 2012/0033370 A1* | 2/2012 | Reinke | G06F 1/185 361/679.4 |
| 2013/0223035 A1* | 8/2013 | Jhou | H05K 3/366 361/785 |
| 2014/0129753 A1* | 5/2014 | Schuette | G06F 13/4068 710/301 |

* cited by examiner

*Primary Examiner* — David E Martinez
(74) *Attorney, Agent, or Firm* — Nixon Peabody LLP (57) ABSTRACT

In some implementations, a riser card can be configured to connect to multiple PCIe connectors on a motherboard of a computing device. The riser card can be configured to route signals from an accessory installed in the riser to the CPU of the computing device through multiple PCIe connectors. The riser card can be configured to connect to a PCIe connector on the motherboard using cabling.

14 Claims, 6 Drawing Sheets

FLEXIBLE PCIE ROUTING

RELATED APPLICATIONS

This application claims priority to U.S. provisional application 62/047,512, filed Sep. 8, 2014, and entitled "Flexible PCIe Routing", the disclosure of which is hereby incorporated herein by reference in its entirety for all purposes.

TECHNICAL FIELD

The disclosure generally relates to routing signals on motherboard of a computing device.

BACKGROUND

A motherboard of a computing device includes circuits that connect various components of the computing device to the CPU. For example, a motherboard can be configured with peripheral component interconnect (PCI) and/or PCI Express (PCIe) connectors that are connected to the CPU installed on a motherboard. Accessory cards (e.g., sound cards, video cards, network cards, etc.) can be plugged into the PCI or PCIe connectors to add functionality to the motherboard and to the computing device. However, because of the limited amount of space on a motherboard and because of the space required by accessory cards and the PCI/PCIe connectors, only a limited number of PCI/PCIe connectors can be configured on the motherboard. Moreover, because there are different types (e.g., sizes) of PCI/PCIe connectors, the right size connector for a desired peripheral component may not always be available for use on the motherboard.

SUMMARY

In some implementations, a riser card can be configured to connect to multiple PCIe connectors on a motherboard of a computing device. The riser card can be configured to route signals from accessory peripheral component installed in the riser to the CPU of the computing device through multiple PCIe connectors. The riser card can be configured to combine communication links from multiple PCIe connectors on a motherboard for use by the peripheral component. The riser card can be configured to connect to a PCIe connector on the motherboard using cabling.

Particular implementations provide at least the following advantages: PCIe connectors in different locations on the motherboard can be combined to provide additional channels to connect an accessory to the CPU; and, by combining PCIe lanes from different connectors, a PCIe accessory can be installed on a motherboard even when the right size PCIe connector is not available.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
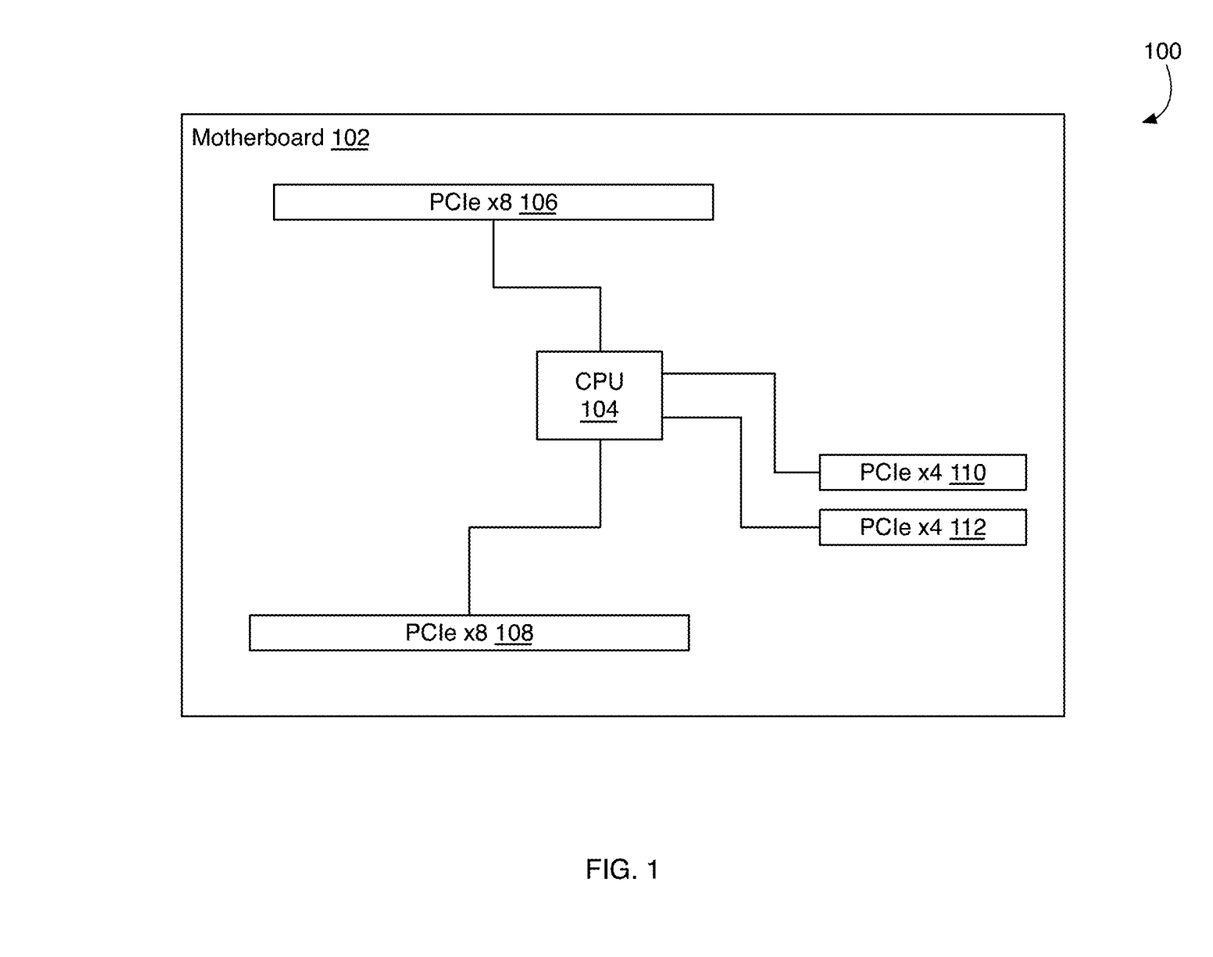
FIG. 1 illustrates an example system for flexible PCIe routing.

FIG. 1 illustrates an example system 100 for flexible PCIe routing. In some implementations, system 100 can include a motherboard 102. For example, motherboard 102 can be the motherboard of a server, laptop, desktop or any other computing device. Motherboard 102 (e.g., mainboard, system board, etc.) can be the main printed circuit board found in a computing device or other expandable system. Motherboard 102 holds many of the crucial electronic components of the system, such as central processing unit (CPU) 104 and memory, and provides connectors for other peripherals (e.g., add-on components, accessories, etc.).

In some implementations, motherboard 102 can be configured with PCIe connectors 106, 108, 110 and 112. For example, peripheral component interconnect express (PCIe) is a high-speed serial computer expansion bus standard. PCIe devices communicate through a logical connection called an interconnect or link. A link is a point-to-point communication channel between two PCIe ports allowing both to send and receive ordinary PCI requests (e.g., configuration read/write, I/O read/write, memory read/write) and interrupts. At the physical level, a link is composed of one or more lanes. Low-speed peripherals (e.g., a Wi-Fi card) use a single-lane (x1) link, while a graphics adapter typically uses a much wider (and thus, faster) 16-lane (x16) link.

A lane includes two differential signaling pairs: one pair for receiving data, the other for transmitting data. Thus, each lane is composed of four wires or signal traces. Conceptually, each lane is used as a full-duplex byte stream, transporting data packets in eight-bit 'byte' format, between endpoints of a link, in both directions simultaneously. Physical PCIe slots may contain from one to thirty-two lanes (e.g., 1, 2, 4, 8, 12, 16 or 32 lanes). Lane counts are written with an 'x' prefix (e.g., x16 represents a sixteen-lane card or slot), with x16 being the largest size in common use.

Referring to FIG. 1, motherboard 102 can include PCIe connectors 106, 108, 110 and 112 of different sizes. For example, the size of each connector (e.g., slot) can correspond to the number of lanes (e.g., communication channels, signal circuits, etc.) that couple a PCIe connector to CPU 104. For example, PCIe connectors 106 and 108 can provide 8 lanes (x8), while PCIe connectors 110 and 112 can provide 4 lanes (x4).

In traditional systems, motherboard 102 can only connect to, or accept, peripheral devices (e.g., cards, accessories) that match the x8 or x4 format of the PCIe connectors 106-112 installed on the motherboard. If a peripheral device requires x16, the x16 peripheral device cannot be installed on motherboard 102 because motherboard 102 does not have an x16 PCIe connector. However, using the flexible PCIe routing mechanisms described herein, the PCIe x8 and/or x4 motherboard connectors can be combined to provide 16 or more lanes for peripheral devices that require more lanes than are provided by the PCIe connectors on motherboard 102.

Figure 2:
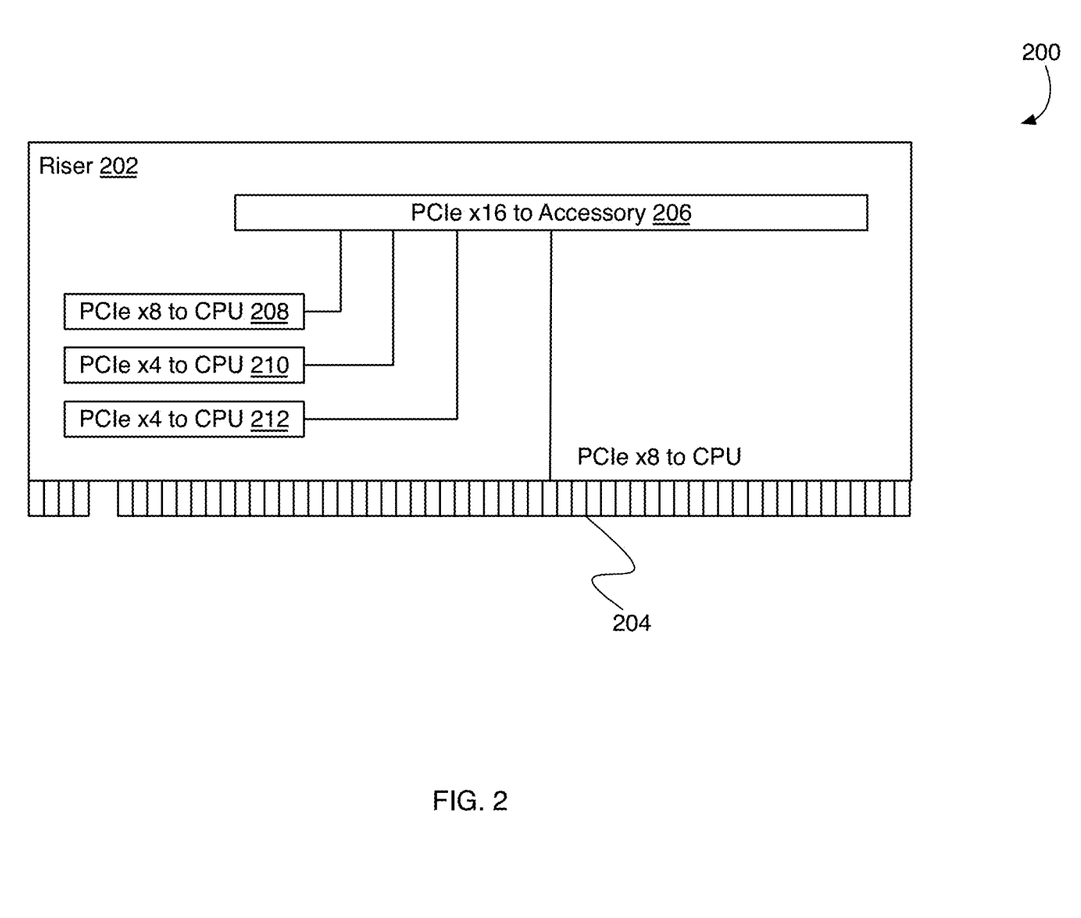
FIG. 2 illustrates an example system for combining multiple PCIe slots on a motherboard using a riser card.

FIG. 2 illustrates an example system 200 for combining multiple PCIe slots on motherboard 102 using riser card 202. For example, riser card 202 can be plugged into a PCIe connector (e.g., slot) on motherboard 102 using pins 204. Pins 204 can be configured to connect to a specific number of PCIe lanes (e.g., x4, x8, x16, etc.). Riser card 202 can include a PCIe accessory (e.g., peripheral) slot 206 for connecting a peripheral device (e.g., sound card, video card, network card, etc.) to motherboard 102 through riser card 202.

In some implementations, accessory slot 206 can provide more PCIe lanes than pins 204. For example, accessory slot 206 can provide 16 lanes (x16) while pins 204 may only provide 8 lanes (x8). Moreover, the accessory (e.g., a x16 graphics card) plugged into slot 206 may require the full 16 lanes to properly operate. Thus, in some implementations, riser card 202 can be configured with PCIe slots 208, 210 and/or 212 for connecting riser card 202 to other PCIe slots on motherboard 102 in order to expand the number of PCIe lanes available to riser card 202 and the PCIe accessory plugged into PCIe slot 206. For example, PCIe slot 208 can be configured to connect to an 8 lane (x8) PCIe slot on motherboard 102 using a PCIe cable. PCIe slots 210 and 212 can each be configured to connect to a different 4 lane (x4) PCIe slot on motherboard 102 using PCIe cables.

Figure 3:
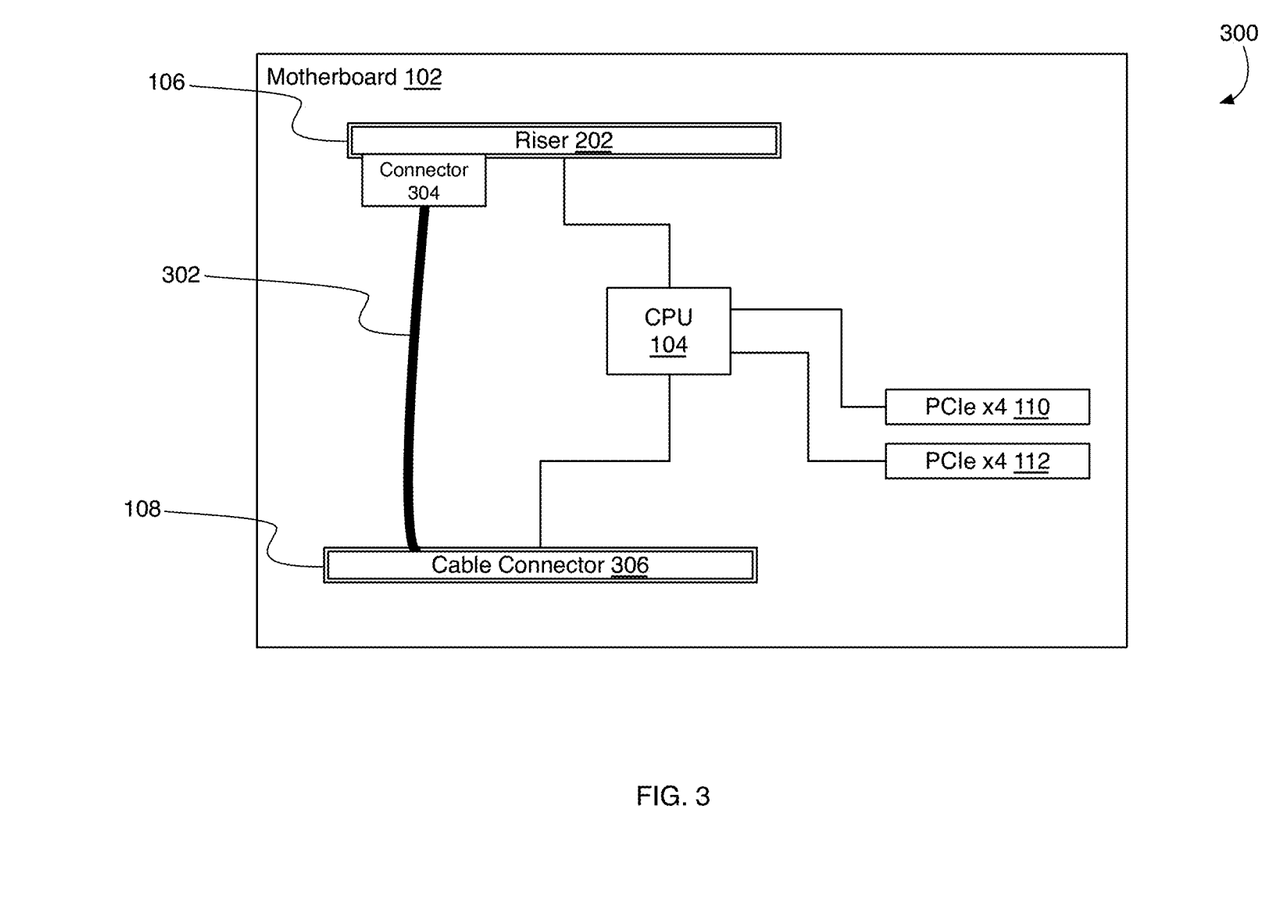
FIG. 3 illustrates an example system for connecting a riser card to different PCIe connectors on a motherboard.

FIG. 3 illustrates an example system 300 for connecting riser card 202 to different PCIe connectors on motherboard 102. For example, in system 300, riser card 202 is installed in PCIe slot 106 of motherboard 102. Slot 106 can be an 8 lane PCIe slot, for example. As described above, a peripheral card (not shown) can be installed on riser card 202 in accessory slot 206. Slot 206 can be a 16 lane (x16) slot and the peripheral card can be a 16 lane (x16) card.

In some implementations, riser card 202 can be connected to PCIe slot 106 and PCIe slot 108 on motherboard 102. For example, in order to provide the full 16 lanes of data transmission required by the peripheral card installed in accessory slot 206 on riser card 202, riser card 202 can be installed in PCIe slot 106 and also connected by cable 302 to PCIe slot 108 on motherboard 102. For example, cable 302 can include end connector 304 and end connector 306. Connector 304 and connector 306 can be configured for installation in PCIe slots of various sizes. For example, connector 304 can be configured for installation in the 8 lane PCIe slot 208 of riser card 202. Connector 306 can be configured for installation in the 8 lane PCIe slot 108 of motherboard 102.

In some implementations, once cable 302 is installed and connected to riser card 202 and PCIe slot 108, riser card 202 can provide 16 PCIe lanes to the 16 lane (x16) accessory card installed on riser card 202. For example, riser card 202 can be configured with circuitry that connects the 8 PCIe lanes of slot 108 and the 8 PCIe lanes of slot 106 to the 16 PCIe lanes of accessory slot 206 on riser card 202 so that once the x16 accessory card is installed in accessory slot 206, the accessory card will have access to 16 PCIe lanes.

Figure 4:
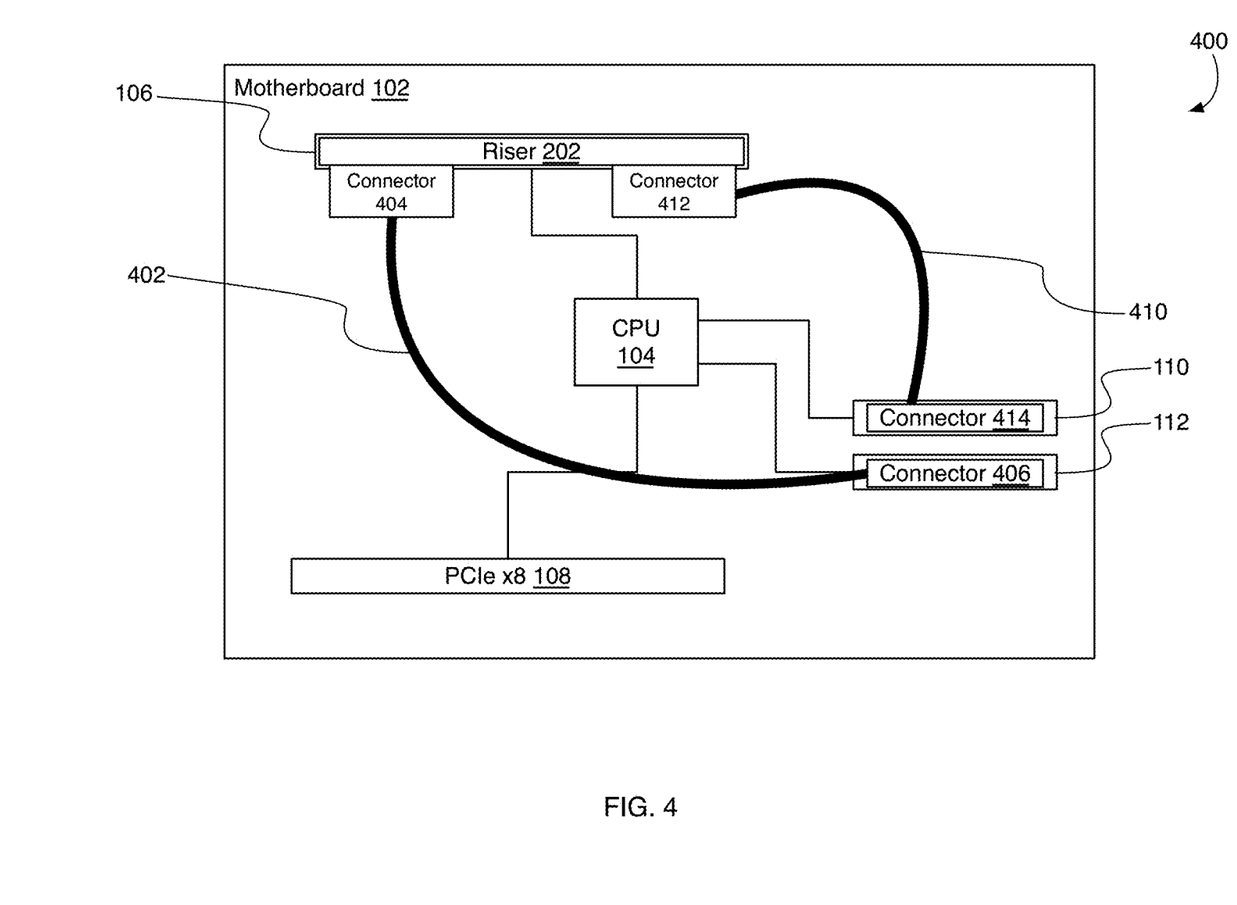
FIG. 4 illustrates an example system for a connecting riser card to multiple PCIe connectors on a motherboard.

FIG. 4 illustrates an example system 400 for connecting riser card 202 to multiple PCIe connectors on motherboard 102. In some implementations, instead using a single cable to connect riser card 202 to one PCIe slot on motherboard 102, two cables can be used to connect riser card 202 to two PCIe slots on motherboard 102. For example, as shown in FIG. 2, riser 202 can include two PCIe x4 slots 210 and 212 for connecting additional PCIe lanes from motherboard 102 to riser card 202. Riser card 202 can be installed in x8 PCIe slot 106 on motherboard 102. Riser card 202 can have an x16 accessory card installed in accessory slot 206. To get the extra 8 PCIe lanes to support the x16 accessory card, riser card 202 can be connected by cable 402 and cable 410 to x4 PCIe slots 110 and 112 on motherboard 102. For example, cable 402 can include end connector 404 and end connector 406. End connector 404 can be connected to PCIe slot 210 on riser card 202. End connector 406 can be connected to PCIe slot 112 on motherboard 102. Similarly, cable 410 can include end connector 412 and end connector 414. End connector 412 can be connected to PCIe slot 212 on riser card 202. End connector 414 can be connected to PCIe slot 110 on motherboard 102. Thus, by combining the x4 PCIe slot 110 and the x4 PCIe slot 112 with the x8 PCIe slot 106, riser card 202 can provide 16 lanes of data transmission to the x16 accessory card installed on riser card 202.

Figure 5:
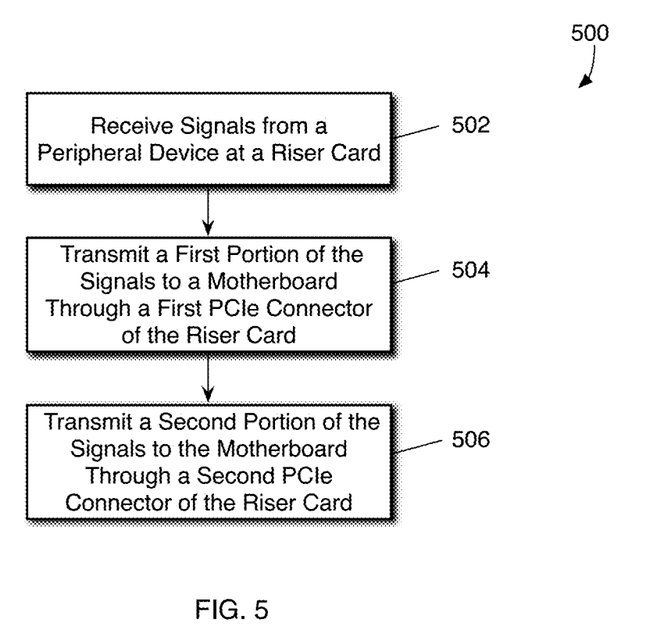
FIG. 5 is a flow diagram of an example process for combining PCIe lanes from different PCIe slots on a motherboard.

FIG. 5 is a flow diagram of an example process 500 for combining PCIe lanes from different PCIe slots on a motherboard. For example, process 500 can be performed by a riser card installed on the motherboard. At 502, the riser card can receive signals from peripheral device. For example, the peripheral device can be installed in a PCIe accessory slot on the riser card. The peripheral device can be a device configured to use 16 PCIe lanes. The PCIe accessory slot into which the peripheral device is installed can be a 16 lane PCIe slot. When the motherboard is powered on, the peripheral device can transmit signals over the 16 lanes provided by the PCIe accessory slot.

At 504, the riser card can transmit a first portion of the signals received from the peripheral device to the motherboard through a first PCIe motherboard connector of the riser card. For example, the first PCIe motherboard connector can be an 8 lane pin-style PCIe connector at the edge of the riser card. The first PCIe motherboard connector can be inserted into x8 PCIe slot on the motherboard to connect the riser card to the motherboard. Once the first PCIe motherboard connector is coupled to the PCIe slot on the motherboard, the riser card can transmit a portion of the signals (e.g., 8 lanes) received from the peripheral device to the motherboard through the x8 PCIe slot on the motherboard.

At 506, the riser card can transmit a second portion of the signals received from the peripheral device to the motherboard through a second PCIe motherboard connector of the riser card. For example, the second PCIe motherboard connector can be an 8 lane PCIe connector configured for connecting to a PCIe cable. The second PCIe motherboard connector can coupled to one end of the cable. The other end of the cable can be connected to an x8 PCIe slot on the motherboard to connect the riser card to the motherboard. Once the second PCIe motherboard connector is coupled to the PCIe slot on the motherboard, the riser card can transmit a portion of the signals (e.g., 8 lanes) received from the peripheral device to the motherboard through PCIe cable and the x8 PCIe slot on the motherboard. Thus, the riser card can be configured to connect to and transmit signals through two different PCIe slots on a motherboard using a PCIe cable.

Example System Architecture

Figure 6:
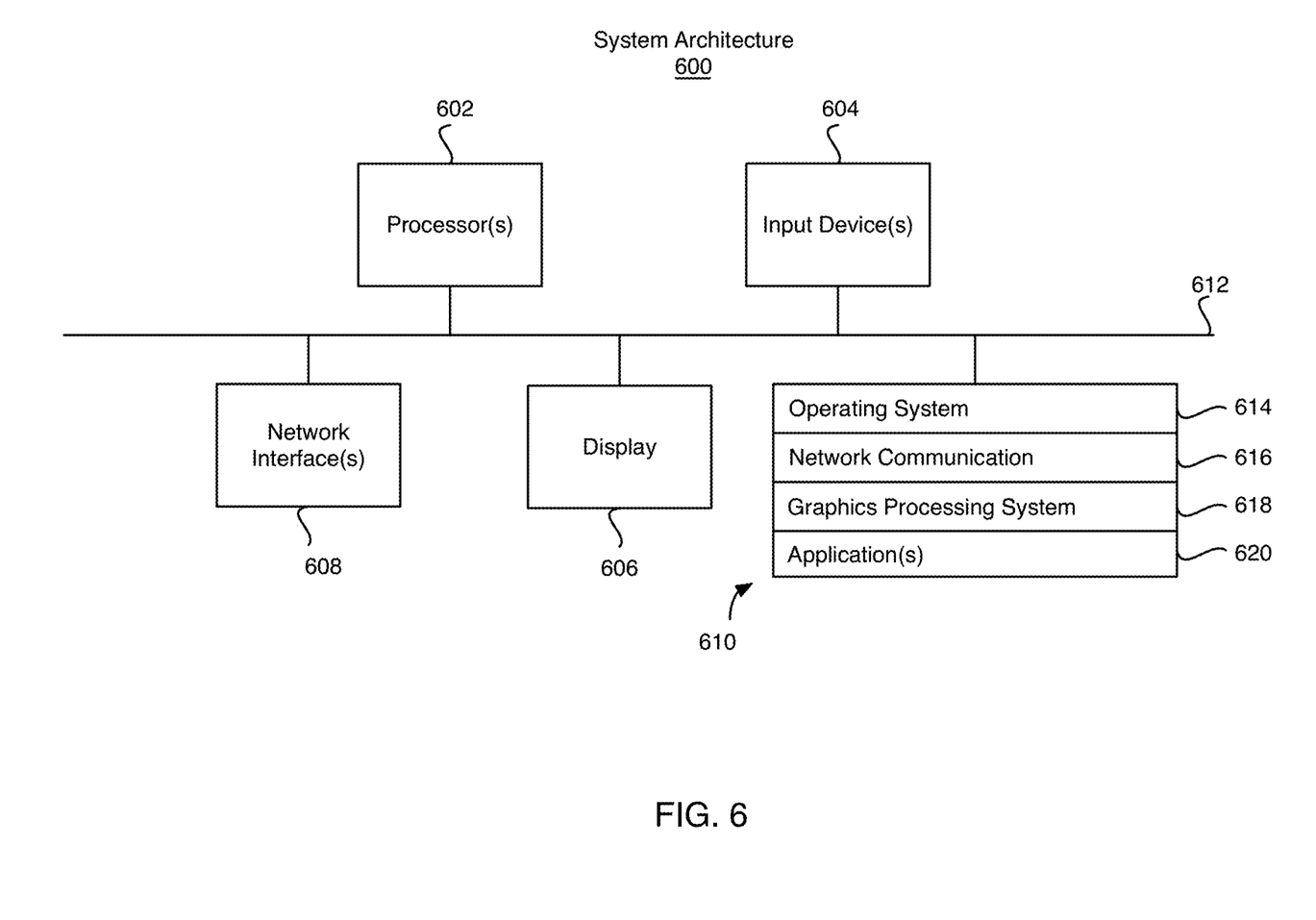
FIG. 6 is a block diagram of an example system architecture implementing the features and processes of FIGS. 1-5.

FIG. 6 is a block diagram of an example system architecture implementing the features and processes of FIGS. 1-5. The architecture 600 can be implemented on any electronic device that runs software applications derived from compiled instructions, including without limitation personal computers, servers, smart phones, media players, electronic tablets, game consoles, email devices, etc. In some implementations, the architecture 600 can include a motherboard, one or more processors 602, one or more input devices 604, one or more display devices 606, one or more network interfaces 608 and one or more computer-readable mediums 610. Each of these components can be coupled by bus 612. For example, bus 612 can be provided by the motherboard described above.

Display device 606 can be any known display technology, including but not limited to display devices using Liquid Crystal Display (LCD) or Light Emitting Diode (LED) technology. Processor(s) 602 can use any known processor technology, including but are not limited to graphics processors and multi-core processors. Input device 604 can be any known input device technology, including but not limited to a keyboard (including a virtual keyboard), mouse, track ball, and touch-sensitive pad or display. Bus 612 can be any known internal or external bus technology, including but not limited to ISA, EISA, PCI, PCI Express, NuBus, USB, Serial ATA or FireWire.

Computer-readable medium 610 can be any medium that participates in providing instructions to processor(s) 602 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 610 can include various instructions 614 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 can establish and maintain network connections (e.g., software for implementing communication protocols, such as TCP/IP, HTTP, Ethernet, etc.).

A graphics processing system 618 can include instructions that provide graphics and image processing capabilities. For example, the graphics processing system 618 can implement the processes described with reference to FIGS. 1-5. Application(s) 620 can be an application that uses or implements the processes described in reference to FIGS. 1-5. The processes can also be implemented in operating system 614.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A circuit card comprising:
   an accessory PCIe slot for connecting a peripheral device with a plurality of PCIe lanes;
   a first PCIe connector with a first number of PCIe lanes for connecting the circuit card to a first PCIe slot on a circuit board with at least the first number of PCIe lanes;
   a second PCIe connector with a second number of PCIe lanes for connecting the circuit card to a second PCIe slot on the circuit board with at least the second number of PCIe lanes; and
   a plurality of electrical traces,
   wherein the plurality of traces simultaneously route a first portion of the plurality of PCIe lanes equal to the first number exclusively to the first PCIe connector and a second portion of the plurality of PCIe lanes equal to the second number exclusively to the second PCIe connector, and wherein the first PCIe connector and the second PCIe connector together define a PCIe interface for routing signals between the peripheral device in the accessory PCIe slot and the circuit board.

2. The circuit card of claim 1, further comprising a first PCIe cable for coupling the second PCIe connector to the second PCIe slot.

3. The circuit card of claim 1, wherein the sum of the first number of PCIe lanes and the second number of PCIe lanes equals a number of the plurality of PCIe lanes.

4. The circuit card of claim 1, wherein the signals comprise data signals.

5. The circuit card of claim 1, further comprising:
   a third PCIe connector with a third number of PCI lanes for connecting the circuit card to a third PCIe slot with at least the third number of PCIe lanes, wherein the plurality of traces are further configured to route a third portion of the plruality of PCIe lanes exclusively to the third PCIe connector, and the PCIe interface for routing the signals is first defined by the third PCIe connector.

6. The circuit card of claim 5, further comprising a second PCIe cable for coupling the third PCIe connector to the third PCIe slot.

7. The circuit card of claim 1, wherein the first PCIe connector is configured to be is directly connected to the first PCIe slot on the circuit board.

8. A computing device, comprising:
   a motherboard comprising a first PCIe slot with at least a first number of lanes and a second PCIe slot with at least a second number of lanes; and
   circuit card comprising:
      an accessory PCIe slot for connecting a peripheral device with a plurality of PCIe lanes;
      a first PCIe connector with the first number of PCIe lanes for connecting the circuit card to the first PCIe slot;
      a second PCIe connector with the second number of PCIe lanes for connecting the circuit card to a second PCIe slot; and
      a plurality of electrical traces,
      wherein the plurality of traces simultaneously route a first portion of the plurality of PCIe lanes equal to the first number exclusively to the first PCIe connector and a second portion of the plurality of PCIe lanes equal to the second number exclusively to the second PCIe connector, and wherein the first PCIe connector and the second PCIe connector together define a PCIe interface for routing signals between the peripheral device in the accessory PCIe slot and the motherboard.

9. The computing device of claim 8, further comprising a first PCIe cable for coupling the second PCIe connector to the second PCIe slot.

10. The computing device of claim 8, wherein the sum of the first number of PCIe lanes and the second number of PCIe lanes equals a number of the plurality of PCIe lanes.

11. The computing device of claim 8, wherein the signals comprise data signals.

12. The computing device of claim 8, further comprising:
   a third PCIe connector with a third number of PCI lanes for connecting the circuit card to a third PCIe slot with at least the third number of PCIe lanes, wherein the plurality of traces are further configured to route a third portion of the plurality of PCIe lanes exclusively to the third PCIe connector, and wherein the PCIe interface for routing the signals is further defined by the third PCIe connector.

13. The computing device of claim 12, further comprising a second PCIe cable for coupling the third PCIe connector to the third PCIe slot.

14. The computing device of claim 8, wherein the first PCIe connector configured to be directly connected to the first PCIe slot on the motherboard.

* * * * *